United States Patent
Lee et al.

(10) Patent No.: US 11,866,625 B2
(45) Date of Patent: Jan. 9, 2024

(54) CURABLE COMPOSITION, CURED LAYER USING THE SAME, AND DISPLAY DEVICE INCLUDING CURED LAYER

(71) Applicant: Samsung SDI Co., Ltd., Yongin-si (KR)

(72) Inventors: Injae Lee, Suwon-si (KR); Yonghee Kang, Suwon-si (KR); Jonggi Kim, Suwon-si (KR); Minjee Park, Suwon-si (KR); Dongjun Kim, Suwon-si (KR); Bumjin Lee, Suwon-si (KR); Minkyeol Chung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 17/444,812

(22) Filed: Aug. 10, 2021

(65) Prior Publication Data
US 2022/0056334 A1 Feb. 24, 2022

(30) Foreign Application Priority Data
Aug. 20, 2020 (KR) .................... 10-2020-0104367

(51) Int. Cl.
| | | |
|---|---|---|
| C08F 2/46 | (2006.01) | |
| C08F 2/50 | (2006.01) | |
| C08G 61/04 | (2006.01) | |
| C09K 11/02 | (2006.01) | |
| C08K 3/32 | (2006.01) | |
| C08K 9/04 | (2006.01) | |
| C08F 220/20 | (2006.01) | |
| C08G 65/00 | (2006.01) | |
| C08F 222/10 | (2006.01) | |
| C08F 222/20 | (2006.01) | |
| C09K 11/88 | (2006.01) | |
| C09K 11/70 | (2006.01) | |
| C09K 11/56 | (2006.01) | |
| C08K 3/30 | (2006.01) | |
| B82Y 20/00 | (2011.01) | |
| B82Y 30/00 | (2011.01) | |
| B82Y 40/00 | (2011.01) | |

(52) U.S. Cl.
CPC .......... *C09K 11/025* (2013.01); *C08F 220/20* (2013.01); *C08F 222/102* (2020.02); *C08F 222/20* (2013.01); *C08G 65/00* (2013.01); *C08K 3/30* (2013.01); *C08K 3/32* (2013.01); *C08K 9/04* (2013.01); *C09K 11/565* (2013.01); *C09K 11/70* (2013.01); *C09K 11/883* (2013.01); *B82Y 20/00* (2013.01); *B82Y 30/00* (2013.01); *B82Y 40/00* (2013.01); *C08K 2003/3036* (2013.01)

(58) Field of Classification Search
CPC ...... C08F 220/20; C08F 222/102; C08K 3/30; C08K 3/32; C08K 9/04; C08K 2003/3036; C09D 4/00; C09K 11/025; C09K 11/565; C09K 11/883; C09K 11/02; C09K 11/70; C08G 65/00; C08G 75/045; B82Y 30/00; B82Y 20/00; B82Y 40/00
USPC ......... 522/183, 182, 178, 1, 6, 189, 184, 71; 520/1
See application file for complete search history.

(56) References Cited

U.S. PATENT DOCUMENTS

| | | |
|---|---|---|
| 10,508,232 B2 | 12/2019 | Huang et al. |
| 2017/0090248 A1 | 3/2017 | Yoneyama et al. |
| 2019/0278177 A1 | 9/2019 | Jeong et al. |
| 2020/0248068 A1 | 8/2020 | Choi et al. |

FOREIGN PATENT DOCUMENTS

| | | | |
|---|---|---|---|
| CN | 108431647 A | 8/2018 | |
| CN | 108864384 A | 11/2018 | |
| CN | 111454711 A | 7/2020 | |
| JP | 2018-131613 A | 8/2018 | |
| JP | 2018-529793 A | 10/2018 | |
| JP | 2020-118971 A | 8/2020 | |
| KR | 10-2016-0147857 A | 12/2016 | |
| KR | 10-2018-0067243 A | 6/2018 | |
| KR | 10-2018-0124577 A | 11/2018 | |
| KR | 10-2019-0004536 A | 1/2019 | |
| KR | 10-2019-0007069 A | 1/2019 | |
| KR | 1020210012828 | * 2/2021 | |
| TW | 202028418 A2 | 8/2020 | |
| WO | WO 2018/004015 A1 | 1/2018 | |
| WO | WO-2018004015 A1 | * 1/2018 | ............... B32B 7/12 |
| WO | WO 2018/028869 A1 | 2/2018 | |

OTHER PUBLICATIONS

Lee, WO 2018004015 Machine Translation, Jan. 4, 2018 (Year: 2018).*

(Continued)

*Primary Examiner* — Jessica Whiteley

(74) *Attorney, Agent, or Firm* — Lewis Roca Rothgerber Christie LLP

(57) ABSTRACT

A curable composition, a cured layer manufactured utilizing the same, and a display device including the cured layer are provided. The curable composition includes (A) a quantum dot; and (B) a polymerizable compound, wherein the polymerizable compound is a compound represented by Chemical Formula 1.

Chemical Formula 1

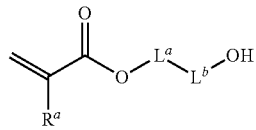

In Chemical Formula 1, each substituent is the same as defined in the specification.

18 Claims, 7 Drawing Sheets

(56) References Cited

OTHER PUBLICATIONS

Kang et al., KR 1020210012828 Machine Translation, Feb. 3, 2021 (Year: 2021).*
Taiwanese Office Action dated Apr. 11, 2022, and Search Report, for Application No. 110129953, 8 pages.

* cited by examiner

CURABLE COMPOSITION, CURED LAYER USING THE SAME, AND DISPLAY DEVICE INCLUDING CURED LAYER

CROSS-REFERENCE TO RELATED APPLICATION

This application claims priority to and the benefit of Korean Patent Application No. 10-2020-0104367, filed in the Korean Intellectual Property Office on Aug. 20, 2020, the entire content of which is incorporated herein by reference.

BACKGROUND

1. Field

This disclosure relates to a curable composition, a cured layer utilizing the same, and a display device including the cured layer.

2. Description of the Related Art

In the case of general (e.g., related art) quantum dots, due to hydrophobic surface characteristics, a solvent in which the quantum dots can be dispersed is limited, and thus, it is difficult to introduce (e.g., disperse) the quantum dots into a polar system such as a binder or a curable monomer.

For example, even in the case of a quantum dot ink composition, which is being actively researched, a polarity thereof is relatively low in an initial process step (task) and it may be dispersed in a solvent utilized in a curable composition having a high hydrophobicity. Because it is difficult to include quantum dots at an amount of 20 wt % or more based on a total amount of the composition, it is therefore difficult (e.g., impossible) to increase photo efficiency (e.g., luminous efficiency, quantum efficiency, etc.) of the ink over a certain level. For example, even though quantum dots may be additionally added and dispersed in order to increase photo efficiency, a viscosity may exceed a range (e.g., 12 cPs) suitable for ink-jetting and processability may be unsatisfactory. That is, when the viscosity of the quantum dot ink composition exceeds the range (e.g., 12 cPs) that is suitable for ink-jet printing due to the addition of additional quantum dots, processability may be compromised.

In order to achieve the viscosity range capable of (e.g., suitable for) ink-jetting, a method of lowering an ink solid content by dissolving (e.g., adding) 50 wt % or more of a solvent based on a total amount of the composition has been utilized, which does provide a somewhat satisfactory result in terms of viscosity. However, even though it may be considered to have a satisfactory result in terms of viscosity, nozzle drying due to solvent volatilization (e.g., evaporation), nozzle clogging, and reduction of a single layer (e.g., reduction of a layer thickness) as time passed after jetting may become worse and it is difficult to control a thickness deviation after curing. Thus, it is difficult to apply it (e.g., this method) to actual processes.

Therefore, a quantum dot ink that does not include a solvent is the desirable (e.g., most desirable) form to be applied to an actual process. As such, the current technique of applying a quantum dot itself to a solvent type composition (e.g., solvent based composition) is limited to a certain extent.

Also, currently, in the case of the desirable (e.g., most desirable) solvent type composition (e.g., solvent based composition) to be applied to the actual process, the quantum dots, which are not surface-modified, such as through ligand-substitution, are included in a content of about 20 wt % to 25 wt % based on a total amount of a solvent type composition (e.g., solvent based composition). Therefore, it is difficult to increase photo efficiency and an absorption rate due to a limitation of viscosity. Meanwhile, attempts have been made to lower the content of the quantum dots and increase the content of the light diffusing agent (scatterer) to provide other improvement approaches, but this has also failed to solve a precipitation problem and a low photo efficiency problem.

Accordingly, there is a growing need for a solvent-free composition. In the case of a solvent-free composition, there is a problem that the pattern (e.g., a film layer with a certain pattern deposited on a substrate) is detached due to a decrease of a close-contacting force (e.g., adhesion force) between a curing process or the subsequent process due to a high shrinkage during curing. That is, the deposited film may be detached from the substrate during the curing process or subsequent process due to lower adhesion force, and/or due to higher shrinkage during the curing process.

SUMMARY

An aspect according to embodiments of the present disclosure is directed toward a curable composition capable of reducing or minimizing processability problems such as pattern lifting by having high photo efficiency and improved close-contacting force (e.g., adhesion force) of a pattern.

An aspect according to embodiments of the present disclosure is directed toward a cured layer manufactured utilizing the curable composition.

An aspect according to embodiments of the present disclosure is directed toward a display device including the cured layer.

According to an embodiment, a curable composition includes (A) a quantum dot; and (B) a polymerizable compound, wherein the polymerizable compound includes a compound represented by Chemical Formula 1.

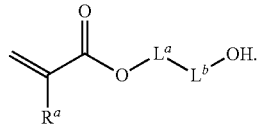

Chemical Formula 1

In Chemical Formula 1,
$R^a$ is a hydrogen atom or a substituted or unsubstituted C1 to C20 alkyl group, and
$L^a$ and $L^b$ are each independently a substituted or unsubstituted C1 to C20 oxyalkylene group or a substituted or unsubstituted C1 to C20 alkylene group, and $L^a$ and $L^b$ are different.

The substituted or unsubstituted C1 to C20 oxyalkylene group may be represented by Chemical Formula 2.

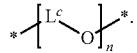

Chemical Formula 2

In Chemical Formula 2,
$L^c$ is a substituted or unsubstituted C1 to C20 alkylene group, and
n is an integer of 1 to 10.

The compound represented by Chemical Formula 1 may be included at about 0.5 wt % to about 10 wt % in amount based on a total amount of the curable composition.

The polymerizable compound may further include a polymerizable compound having a carbon-carbon double bond at each terminal end.

The polymerizable compound having the carbon-carbon double bond at each terminal end may have a weight average molecular weight of about 200 g/mol to about 1,000 g/mol.

The polymerizable compound having the carbon-carbon double bond at each terminal end may be represented by Chemical Formula 3.

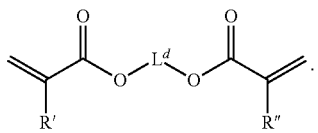

Chemical Formula 3

In Chemical Formula 3,

R' and R" are each independently a hydrogen atom or a substituted or unsubstituted C1 to C20 alkyl group, and $L^d$ is a substituted or unsubstituted C5 to C20 alkylene group.

The polymerizable compound represented by Chemical Formula 1 may be included at about 1 wt % to about 15 wt % in amount, and the polymerizable compound having the carbon-carbon double bond at each terminal end may be included at about 85 wt % to about 99 wt % in amount, each based on a total amount of the polymerizable compound.

The quantum dots may be surface-modified with a compound represented by one of Chemical Formula 4 to Chemical Formula 17 or a combination thereof.

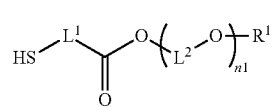

Chemical Formula 4

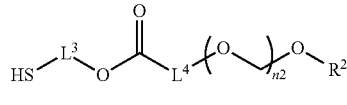

Chemical Formula 5

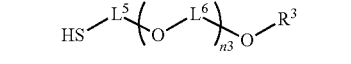

Chemical Formula 6

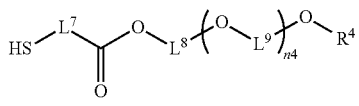

Chemical Formula 7

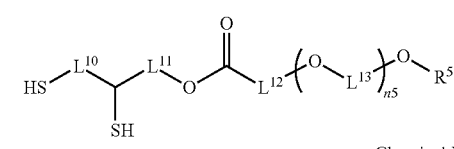

Chemical Formula 8

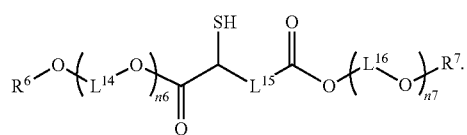

Chemical Formula 9

In Chemical Formula 4 to Chemical Formula 9, $R^1$ to $R^7$ are each independently a substituted or unsubstituted C1 to C10 alkyl group or a substituted or unsubstituted C6 to C20 aryl group, $L^1$ to $L^{16}$ are each independently a substituted or unsubstituted C1 to C10 alkylene group, and n1 to n7 are each independently an integer of 0 to 10.

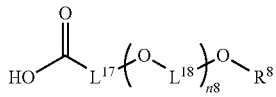

Chemical Formula 10

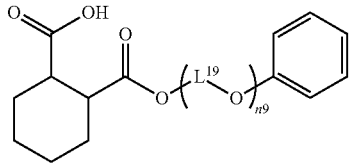

Chemical Formula 11

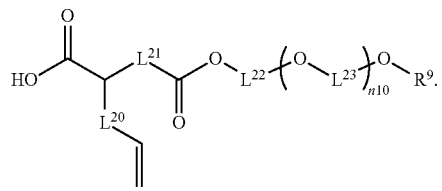

Chemical Formula 12

In Chemical Formula 10 to Chemical Formula 12, $R^8$ and $R^9$ are each independently a substituted or unsubstituted C1 to C10 alkyl group, $L^{17}$ to $L^{23}$ are each independently a substituted or unsubstituted C1 to C10 alkylene group, and n8 to n10 are each independently an integer of 0 to 10.

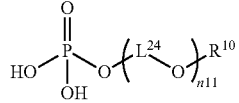

Chemical Formula 13

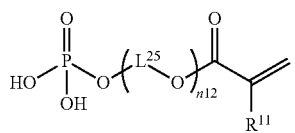

Chemical Formula 14

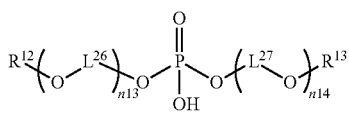

Chemical Formula 15

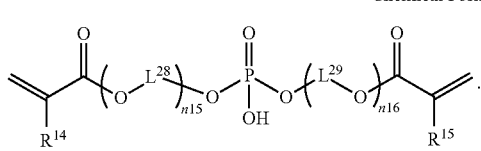

Chemical Formula 16

In Chemical Formula 13 to Chemical Formula 16, $R^{10}$ to $R^{15}$ are each independently a hydrogen atom or a substituted or unsubstituted C1 to C10 alkyl group, $L^{24}$ to $L^{29}$ are each independently a substituted or unsubstituted C1 to C10 alkylene group, and n11 to n16 are each independently an integer of 0 to 10.

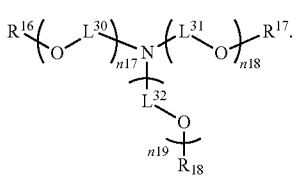

Chemical Formula 17

In Chemical Formula 17, $R^{16}$ to $R^{18}$ are each independently a substituted or unsubstituted C1 to C10 alkyl group, $L^{30}$ to $L^{32}$ are each independently a substituted or unsubstituted C1 to C10 alkylene group, and n17 to n19 are each independently an integer of 0 to 10.

The quantum dots may have a maximum fluorescence emission wavelength in a range of about 500 nm to about 680 nm.

The curable composition may further include a polymerization initiator, a light diffusing agent, a polymerization inhibitor, a binder resin, or a combination thereof.

The light diffusing agent may include barium sulfate, calcium carbonate, titanium dioxide, zirconia, or a combination thereof.

The curable composition may be a solvent-free (e.g., without any solvent) curable composition.

The solvent-free curable composition may include about 1 wt % to about 60 wt % of the (A) quantum dot; and about 40 wt % to about 99 wt % of the (B) polymerizable compound based on a total amount (i.e., a total weight) of the solvent-free curable composition.

The curable composition may include malonic acid; 3-amino-1,2-propanediol; a silane coupling agent; a leveling agent; a fluorine-based surfactant; or a combination thereof.

The curable composition may further include a solvent. Herein, the curable composition may include about 1 wt % to about 40 wt % of the (A) quantum dot; about 1 wt % to about 20 wt % of the (B) polymerizable compound; and about 40 wt % to about 80 wt % of the solvent based on a total amount (i.e., a total weight) of the curable composition.

According to another embodiment, a cured layer may be manufactured utilizing the curable composition.

According to another embodiment, a display device may include the cured layer.

Other embodiments of the present disclosure may be included in the following detailed description.

The curable composition may be capable of solving processability problems (such as pattern lifting) by increasing a close-contacting force (e.g., adhesion force) of a pattern while maintaining high light efficiency.

DETAILED DESCRIPTION

Figure 1:
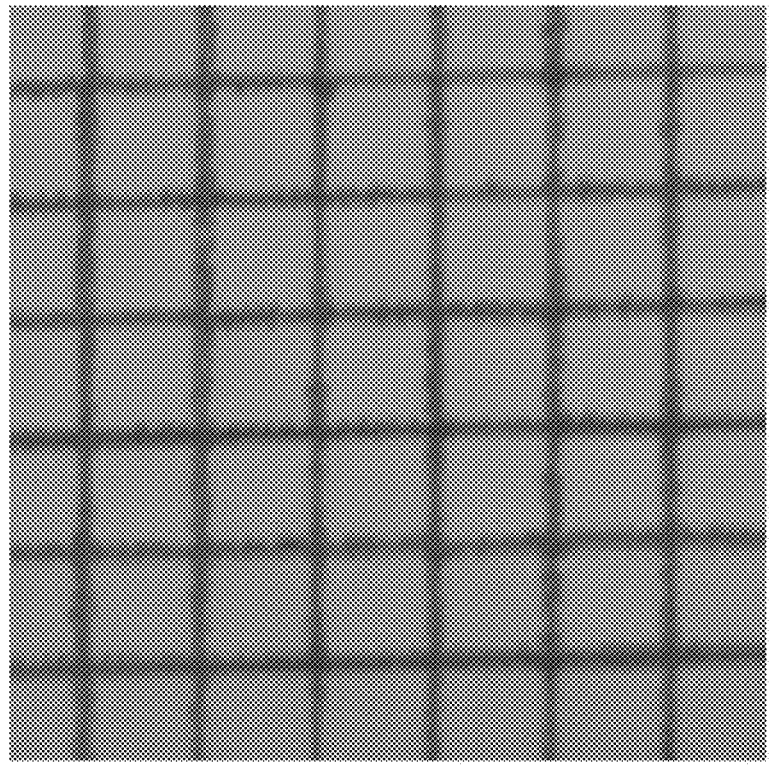
FIG. 1 is a photograph showing the cross-cut evaluation result of a pattern after applying the curable composition according to Example 1 on a substrate and developing the same.

Hereinafter, embodiments of the present disclosure are described in more detail. However, these embodiments are exemplary, the present disclosure is not limited thereto and the subject matter of the present disclosure is defined by the scope of claims, and equivalents thereof.

As used herein, when specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C3 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when specific definition is not otherwise provided, the term "substituted" refers to replacement of at least one hydrogen atom by a substituent selected from a halogen atom (F, Cl, Br, and/or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, and a combination thereof.

As used herein, when specific definition is not otherwise provided, the term "hetero" refers to inclusion of at least one heteroatom selected from N, O, S, and P, in addition to carbon atom(s), in the chemical formula.

As used herein, when specific definition is not otherwise provided, the term "(meth)acrylate" refers to both "acrylate" and "methacrylate", and the term "(meth)acrylic acid" refers to both "acrylic acid" and "methacrylic acid."

As used herein, when specific definition is not otherwise provided, the term "combination" refers to mixing or copolymerization.

In the present specification, when a definition is not otherwise provided, hydrogen is bonded at the position where a chemical bond is supposed to exist but is not drawn in a chemical formula.

In addition, in the present specification, when a definition is not otherwise provided, "*" refers to a linking point with the same or different atom or chemical formula.

A curable composition according to an embodiment includes (A) quantum dots; and (B) a polymerizable compound, wherein the polymerizable compound includes a compound represented by Chemical Formula 1.

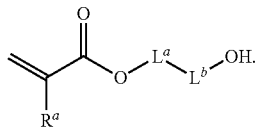

Chemical Formula 1

In Chemical Formula 1, $R^a$ is a hydrogen atom or a substituted or unsubstituted C1 to C20 alkyl group, and $L^a$ and $L^b$ are each independently a substituted or unsubstituted C1 to C20 oxyalkylene group or a substituted or unsubstituted C1 to C20 alkylene group, but $L^a$ and $L^b$ are different (i.e., from each other).

As described above, because the curable composition may have a high shrinkage rate during the curing process, as a close-contacting force (e.g., adhesion force) of a pattern (e.g., a patterned layer formed from curing the curable composition) formed thereof is deteriorated, a problem that the pattern is lifted and detached (e.g., from a substrate) may occur continuously. In order to solve this problem, a method of making the core of a quantum dot much smaller during synthesis of the quantum dot to blue-shift the wavelength of the emitted light is currently much utilized. However, when cured after the coating process, the curable composition has a drawback of deteriorating light resistance and heat resistance in a single film. Accordingly, the present inventors repeated trials and errors and solved the concern of the deterioration of light resistance and heat resistance by applying the polymerizable compound represented by Chemical Formula 1 in order to prevent or substantially prevent detachment of a pattern (e.g., detachment of a patterned layer from a substrate) and thus increase a close-contacting force (e.g., an adhesion force) with a pattern (e.g., with another layer or substrate) at the interface, and furthermore by surface-modifying the quantum dot with a specific ligand to improve agglomeration of quantum dots during the curing.

Hereinafter, each component is described in more detail.

(B) Polymerizable Compound

For example, the compound represented by Chemical Formula 1 may include an oxyalkylene group, and the oxyalkylene group may be represented by Chemical Formula 2.

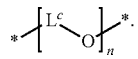

Chemical Formula 2

In Chemical Formula 2, $L^c$ is a substituted or unsubstituted C1 to C20 alkylene group, and n is an integer of 1 to 10.

The curable composition according to an embodiment includes the compound represented by Chemical Formula 1, thereby achieving high close-contacting force (e.g., adhesion force), which leads to improvement in processability.

For example, the compound represented by Chemical Formula 1 may be included in an amount of about 0.5 wt % to about 10 wt %, for example, about 1 wt % to about 5 wt %, based on the total amount of the curable composition. When the compound represented by Chemical Formula 1 is included in an amount of less than about 0.5 wt % based on the total amount of the curable composition, the effect of increasing the close-contacting force (e.g., adhesion force) of the pattern (e.g., the layer formed from patterning and/or curing the curable composition) may not (e.g., cannot) be achieved. When the compound represented by Chemical Formula 1 is included in an amount exceeding about 10 wt %, it is difficult to achieve the desired effect of increasing the close-contacting force (e.g., adhesion force) of the pattern (e.g., an additional pattern), which is also uneconomical, and the viscosity changes over time may become severe, which may cause deterioration of processability.

The polymerizable compound may further include, for example, a polymerizable compound having carbon-carbon double bonds at each terminal end (e.g., at both terminal ends).

The polymerizable compound having carbon-carbon double bonds at both terminal ends may be included in an amount of about 39 wt % to about 98 wt %, for example, about 40 wt % to about 85 wt %, or about 40 wt % to about 80 wt % based on the total amount of the curable composition, when the curable composition is a solvent-free curable composition. When the content of the polymerizable compound having the carbon-carbon double bond at both terminal ends is within the above ranges, it is possible to prepare a solvent-free curable composition having a viscosity suitable for (e.g., capable of) ink-jetting, and the quantum dots in the prepared solvent-free curable composition have suitable (e.g., excellent) dispersibility to improve optical properties.

In addition, when the curable composition is a solvent type curable composition (e.g., solvent based curable composition), the compound having the carbon-carbon double bonds at the terminal ends may be included in an amount of about 1 wt % to about 20 wt %, for example, about 5 wt % to about 20 wt %, based on the total amount of the curable composition. When the compound having the carbon-carbon double bond at both terminal ends is included within the above ranges, the optical properties of the quantum dots may be improved.

For example, the polymerizable compound having the carbon-carbon double bond at both terminal ends may have a weight average molecular weight of about 200 g/mol to about 1,000 g/mol. When the weight average molecular weight of the polymerizable compound having the carbon-carbon double bonds at both terminal ends is within the above range, it may be desirable for ink-jetting because the viscosity of the composition is not increased and the optical properties of the quantum dots are not impaired.

For example, the polymerizable compound having the carbon-carbon double bond at both terminal ends may be represented by Chemical Formula 3, but the present disclosure is not necessarily limited thereto.

Chemical Formula 3

$$\underset{R'}{\overset{O}{\overset{\|}{\underset{}{\diagup}}}}\!\!-\!\!O\!-\!L^d\!-\!O\!-\!\underset{R''}{\overset{O}{\overset{\|}{\underset{}{\diagdown}}}}$$

In Chemical Formula 3,

R' and R" are each independently a hydrogen atom or a substituted or unsubstituted C1 to C20 alkyl group, and $L^d$ is a substituted or unsubstituted C5 to C20 alkylene group.

For example, the compound having a carbon-carbon double bond at both terminal ends may be represented by Chemical Formula 3-1 or Chemical Formula 3-2, but the present disclosure is not necessarily limited thereto.

Chemical Formula 3-1

$$\text{(structure)}$$

Chemical Formula 3-2

$$\text{(structure)}$$

For example, the compound having the carbon-carbon double bond at both terminal ends may include ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, triethylene glycoldimethacrylate, propylene glycoldimethacrylate, 1,4-butanedioldimethacrylate, 1,6-hexanedioldimethacrylate, or a combination thereof, in addition to the compound represented by Chemical Formula 3-1 or Chemical Formula 3-2.

Also, in addition to the polymerizable compound having the carbon-carbon double bond at both terminal ends, a generally-utilized monomer in related art thermosetting or photocurable compositions may be further utilized as the polymerizable compound, and the monomer may further include an oxetane-based compound such as bis[1-ethyl(3-oxetanyl)]methyl ether.

For example, the compound represented by Chemical Formula 1 may be included in an amount of about 1.5 wt % to about 15 wt % and the compound having the carbon-carbon double bond at both terminal ends may be included in an amount of about 85 wt % to about 98.5 wt % based on the total amount of the polymerizable compound. When each compound is included within the respective content range, a close-contacting force (e.g., adhesion force) of the pattern at the interface (e.g., with a substrate or another layer) may be maximized or enhanced.

(A) Quantum Dot

The quantum dots in the curable composition according to an embodiment may be, for example, quantum dots surface-modified with a ligand having a polar group, for example, a ligand having high affinity with the polymerizable compound. In the case of the surface-modified quantum dots as described above, it is very easy to prepare a high-concentration or highly-concentrated quantum dot dispersion (improving the dispersibility of the quantum dots with respect to the polymerizable compound), which can have a great effect on improving the photoefficiency and for example, may be desirable to implement a solvent-free curable composition.

For example, the ligand having a polar group may have a structure having high affinity with the chemical structure of the polymerizable compound.

For example, the ligand having the polar group may be represented by any one of Chemical Formula 4 to Chemical Formula 17, but the present disclosure is not necessarily limited thereto.

Chemical Formula 4

$$HS\!-\!L^1\!-\!\underset{O}{\overset{O}{\overset{\|}{C}}}\!-\!O\!-\!(L^2\!-\!O)_{n1}\!-\!R^1$$

Chemical Formula 5

$$HS\!-\!L^3\!-\!O\!-\!\underset{O}{\overset{O}{\overset{\|}{C}}}\!-\!L^4\!-\!(O\!\diagdown\!)_{n2}\!-\!O\!-\!R^2$$

Chemical Formula 6

$$HS\!-\!L^5\!-\!(O\!-\!L^6)_{n3}\!-\!O\!-\!R^3$$

Chemical Formula 7

$$HS\!-\!L^7\!-\!\underset{O}{\overset{O}{\overset{\|}{C}}}\!-\!O\!-\!L^8\!-\!(O\!\diagdown\!L^9)_{n4}\!-\!O\!-\!R^4$$

Chemical Formula 8

$$HS\!-\!L^{10}\!-\!\underset{SH}{\overset{L^{11}}{\diagdown}}\!-\!O\!-\!\underset{O}{\overset{O}{\overset{\|}{C}}}\!-\!L^{12}\!-\!(O\!\diagdown\!L^{13})_{n5}\!-\!O\!-\!R^5$$

Chemical Formula 9

$$R^6\!-\!O\!-\!(L^{14}\!-\!O)_{n6}\!-\!\underset{O}{\overset{SH}{\diagdown}}\!-\!L^{15}\!-\!O\!-\!\underset{O}{\overset{O}{\overset{\|}{C}}}\!-\!(L^{16}\!-\!O)_{n7}\!-\!R^7.$$

In Chemical Formula 4 to Chemical Formula 9, $R^1$ to $R^7$ are each independently a substituted or unsubstituted C1 to C10 alkyl group or a substituted or unsubstituted C6 to C20 aryl group, $L^1$ to $L^{16}$ are each independently a substituted or unsubstituted C1 to C10 alkylene group, and n1 to n7 are each independently an integer of 0 to 10.

Chemical Formula 10

$$HO\!-\!\underset{O}{\overset{O}{\overset{\|}{C}}}\!-\!L^{17}\!-\!(O\!\diagdown\!L^{18})_{n8}\!-\!O\!-\!R^8$$

Chemical Formula 11

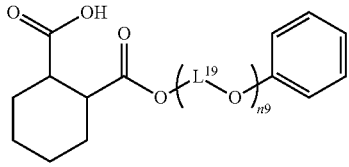

Chemical Formula 12

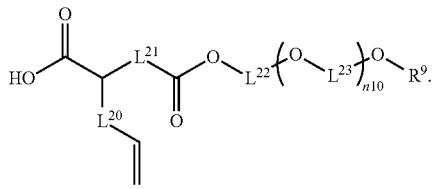

In Chemical Formula 10 to Chemical Formula 12, $R^8$ and $R^9$ are each independently a substituted or unsubstituted C1 to C10 alkyl group, $L^{17}$ to $L^{23}$ are each independently a substituted or unsubstituted C1 to C10 alkylene group, and n8 to n10 are each independently an integer of 0 to 10.

Chemical Formula 13

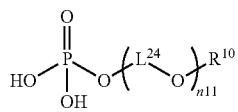

Chemical Formula 14

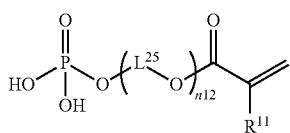

Chemical Formula 15

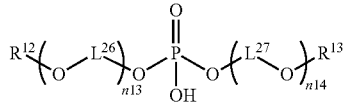

Chemical Formula 16

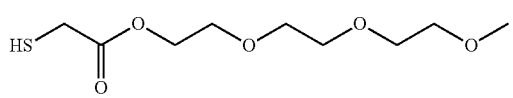

In Chemical Formula 13 to Chemical Formula 16, $R^{10}$ to $R^{15}$ are each independently a hydrogen atom or a substituted or unsubstituted C1 to C10 alkyl group, $L^{24}$ to $L^{29}$ are each independently a substituted or unsubstituted C1 to C10 alkylene group, and n11 to n16 are each independently an integer of 0 to 10.

Chemical Formula 17

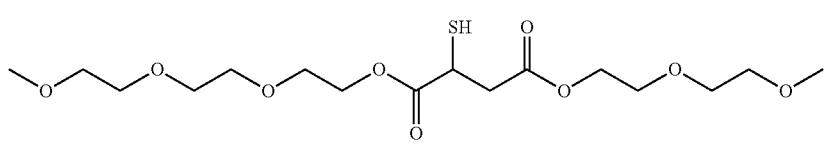

In Chemical Formula 17, $R^{16}$ to $R^{18}$ are each independently a substituted or unsubstituted C1 to C10 alkyl group, $L^{30}$ to $L^{32}$ are each independently a substituted or unsubstituted C1 to C10 alkylene group, and n17 to n19 are each independently an integer of 0 to 10.

For example, the compounds represented by Chemical Formula 4 to Chemical Formula 17 may be any one of the compounds represented by Chemical Formula A to Chemical Formula Q, but the present disclosure is not necessarily limited thereto.

Chemical Formula A

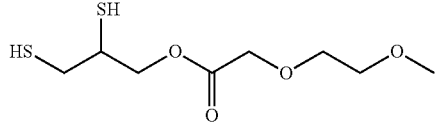

Chemical Formula B

Chemical Formula C

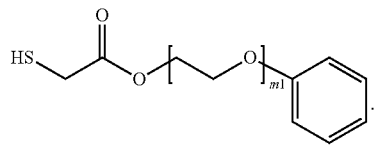

Chemical Formula D

In Chemical Formula D, m1 is an integer of 0 to 10.

Chemical Formula E

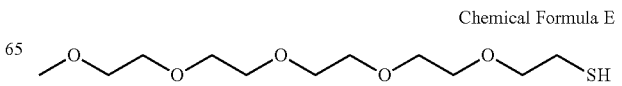

Chemical Formula F
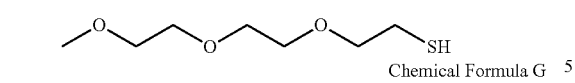

Chemical Formula G
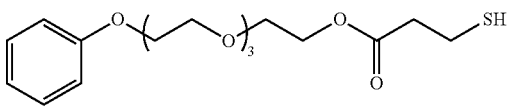

Chemical Formula H
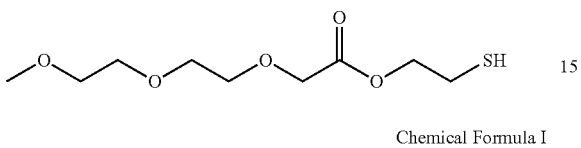

Chemical Formula I
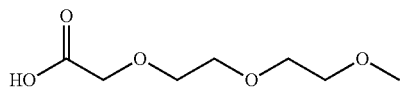

Chemical Formula J
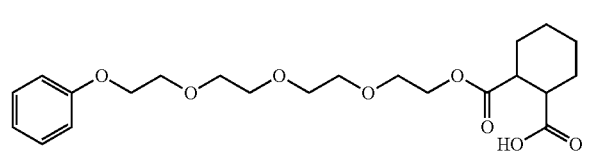

Chemical Formula K
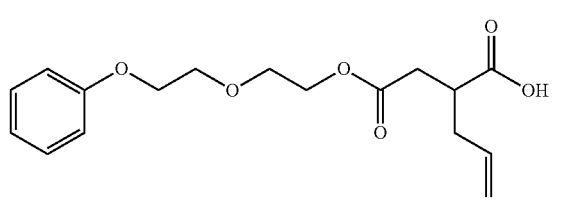

Chemical Formula L
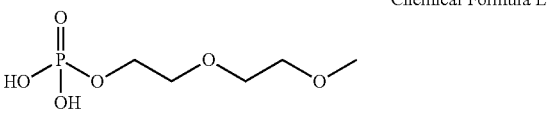

Chemical Formula M
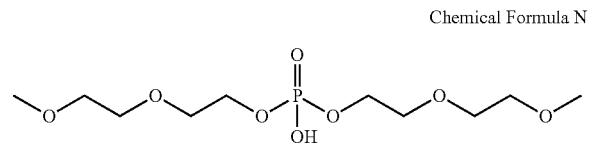

Chemical Formula N
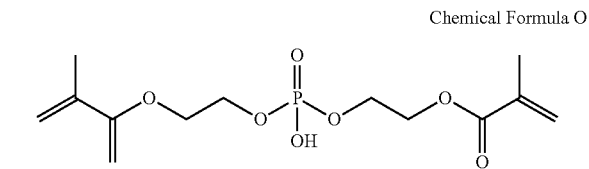

Chemical Formula O

Chemical Formula P
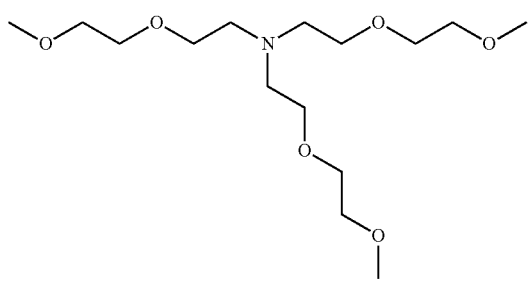

Chemical Formula Q
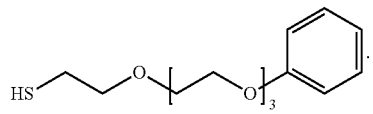

When the ligand is utilized, the surface modification of the quantum dots may become easier, and when the quantum dots surface-modified with the ligand are added to the aforementioned monomer (e.g., the polymerizable compound) and then stirred, a transparent (e.g., very transparent) dispersion may be obtained, which confirms that the surface modification of the quantum dots is properly done (e.g., done very well).

For example, the quantum dots may have a maximum fluorescence emission wavelength in the range of about 500 nm to about 680 nm.

For example, when the curable composition according to an embodiment is a solvent-free curable composition, the quantum dots may be included in an amount of about 1 wt % to about 60 wt %, for example, about 5 wt % to about 60 wt %, about 10 wt % to about 60 wt %, about 20 wt % to about 60 wt %, or about 30 wt % to about 50 wt %. When the quantum dots are included within the above ranges, high light retention rate and photoefficiency may be achieved even after curing.

For example, when the curable composition according to an embodiment is a curable composition including a solvent, the quantum dots may be included in an amount of about 1 wt % to about 40 wt %, for example, about 1 wt % to about 30 wt %, or about 3 wt % to about 20 wt %, based on the total amount of the curable composition. When the quantum dots are included within the above ranges, the light conversion rate is improved, and the pattern characteristics and the developing characteristics are not impaired, and thus improved processability may be obtained.

For example, the quantum dots may absorb light in a wavelength region of about 360 nm to about 780 nm, for example, about 400 nm to about 780 nm, and emit fluorescence in a wavelength region of about 500 nm to about 700 nm, for example, about 500 nm to about 580 nm, or about 600 nm to about 680 nm. That is, the quantum dots may have a maximum fluorescence emission wavelength (fluorescence $\lambda_{em}$) at about 500 nm to about 680 nm.

The quantum dots may (e.g., each independently) have a full width at half maximum (FWHM) of about 20 nm to about 100 nm, for example, about 20 nm to about 50 nm. When the quantum dots have a full width at half maximum (FWHM) of the above ranges, color reproducibility is increased when utilized as a color material in a color filter due to high color purity.

The quantum dots may (e.g., each independently) be formed of an organic material, an inorganic material, or a hybrid (mixture) of an organic material and an inorganic material.

The quantum dots may (e.g., each independently) be composed of a core and a shell around (e.g., surrounding) the core, and the core and the shell may each independently have a structure of a core, a core/shell, a core/first shell/second shell, an alloy, an alloy/shell, and/or the like, which is composed of a Group II-IV compound, a Group III-V compound, and/or the like, but the present disclosure is not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but the present disclosure is not necessarily limited thereto. The shell around (e.g., surrounding) the core may include at least one material selected from CdSe, ZnSe, ZnS, ZnTe, CdTe, PbS, TiO, SrSe, HgSe, and an alloy thereof, but the present disclosure is not necessarily limited thereto.

In an embodiment, because an interest in the environment has recently been much increased over the whole world, and the restriction on toxic materials have also been fortified (e.g., tightened), a cadmium-free light emitting material (InP/ZnS, InP/ZnSe/ZnS, etc.) having slightly lower (e.g., little low) quantum efficiency (quantum yield) but being environmentally-friendly (instead of a light emitting material having a cadmium-based core) is utilized, but the present disclosure is not necessarily limited thereto.

In the case of the quantum dots of the core/shell structure, an entire size including the shell (an average particle diameter) may be about 1 nm to about 15 nm, for example, about 5 nm to about 15 nm.

For example, the quantum dots may (e.g., each independently) include red quantum dots, green quantum dots, or a combination thereof. The red quantum dots may (e.g., each independently) have an average particle diameter of about 10 nm to about 15 nm. The green quantum dots may (e.g., each independently) have an average particle diameter of about 5 nm to about 8 nm. The average particle diameter may be, for example, a median diameter (D50) measured using a laser diffraction particle diameter distribution meter.

Also, for dispersion stability of the quantum dots, the curable composition according to an embodiment may further include a dispersing agent. The dispersing agent helps with uniform dispersibility of light conversion materials such as quantum dots in the curable composition and may include a non-ionic, anionic, or cationic dispersing agent. For example, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and/or the like, and may be utilized alone or in a mixture of two or more. The dispersing agent may be utilized in an amount of about 0.1 wt % to about 100 wt %, for example, about 10 wt % to about 20 wt %, based on a solid content of the light conversion material such as quantum dots.

Light Diffusing Agent (or Light Diffusing Agent Dispersion)

The curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or a combination thereof.

The light diffusing agent may reflect unabsorbed light in the aforementioned quantum dots and allow the quantum dots to absorb the reflected light again. That is, the light diffusing agent may increase an amount of light absorbed by the quantum dots and increase light conversion efficiency of the curable composition.

The light diffusing agent may have an average particle diameter (D50) of about 150 nm to about 250 nm, for example, about 180 nm to about 230 nm. When the average particle diameter of the light diffusing agent is within the above ranges, the light diffusing agent may have a better light diffusing effect and may increase light conversion efficiency.

The light diffusing agent may be included in an amount of about 0.01 wt % to about 20 wt %, for example, about 5 wt % to about 10 wt %, based on the total amount of the curable composition. For example, the light diffusing agent may be included in an amount of about 0.01 wt % to about 10 wt % based on the solid content constituting a solvent-free curable composition as a solid content. When the light diffusing agent is included in less than about 0.01 wt % based on the total amount of the curable composition, it is difficult to expect an effect of improving the light conversion efficiency by utilizing the light diffusing agent, and when it contains more than about 20 wt %, the quantum dot sedimentation problem may occur.

Polymerization Initiator

A curable composition according to an embodiment may further include a polymerization initiator, for example, a photopolymerization initiator, a thermal polymerization initiator, or a combination thereof.

The photopolymerization initiator is a generally-utilized initiator for a resin composition, for example an acetophenone-based compound, a benzophenone-based compound, a thioxanthone-based compound, a benzoin-based compound, a triazine-based compound, an oxime-based compound, an aminoketone-based compound, and/or the like, but the present disclosure is not necessarily limited thereto.

Examples of the acetophenone-based compound may include (e.g., may be) 2,2'-diethoxy acetophenone, 2,2'-dibutoxy acetophenone, 2-hydroxy-2-methylpropinophenone, p-t-butyltrichloroacetophenone, p-t-butyldichloroacetophenone, 4-chloroacetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and/or the like.

Examples of the benzophenone-based compound may include (e.g., may be) benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and/or the like.

Examples of the thioxanthone-based compound may include (e.g., may be) thioxanthone, 2-methylthioxanthone, isopropyl thioxanthone, 2,4-diethyl thioxanthone, 2,4-diisopropyl thioxanthone, 2-chlorothioxanthone, and/or the like.

Examples of the benzoin-based compound may include (e.g., may be) benzoin, benzoin methyl ether, benzoin ethyl ether, benzoin isopropyl ether, benzoin isobutyl ether, benzyldimethylketal, and/or the like.

Examples of the triazine-based compound may include (e.g., may be) 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphthol-yl)-4,6-bis(trichloromethyl)-s-triazine, 2-(4-methoxynaphtho1-yl)-4,6-bis(trichloromethyl)-s-triazine, 2-4-bis (trichloromethyl)-6-piperonyl-s-triazine, 2-4-bis(trichloromethyl)-6-(4-methoxystyryl)-s-triazine, and/or the like.

Examples of the oxime-based compound may include (e.g., may be) O-acyloxime-based compound, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and/or the like. Non-limiting specific examples of the O-acyloxime-based compound may include (e.g., may be) 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and/or the like.

Examples of the aminoketone-based compound may include (e.g., may be) 2-benzyl-2-dimethylamino-1-(4-morpholinophenyl)-butanone-1, and/or the like.

The photopolymerization initiator may further include a carbazole-based compound, a diketone-based compound, a sulfonium borate-based compound, a diazo-based compound, an imidazole-based compound, a biimidazole-based compound, and/or the like, besides the compounds described above.

The photopolymerization initiator may be utilized with a photosensitizer capable of causing a chemical reaction by absorbing light and becoming excited and then, transferring its energy.

Examples of the photosensitizer may include (e.g., may be) tetraethylene glycol bis-3-mercapto propionate, pentaerythritol tetrakis-3-mercapto propionate, dipentaerythritol tetrakis-3-mercapto propionate, and/or the like.

Examples of the thermal polymerization initiator may include (e.g., may be) a peroxide, such as benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, and/or cumene hydroperoxide), dicyclohexyl peroxydicarbonate, t-butyl perbenzoate, and/or the like; an azo polymerization initiator, such as 2,2-azo-bis(isobutyronitrile), 2,2'-azobis-2-methylpropinonitrile, and/or the like, but the present disclosure is not necessarily limited thereto, and any suitable thermal polymerization initiator (e.g., of which is well known in the art) may be utilized.

The polymerization initiator may be included in an amount of about 0.01 wt % to about 5 wt %, for example, about 0.1 wt % to about 4 wt %, based on a total amount of the curable composition. When the polymerization initiator is included in these ranges, it is possible to obtain suitable (e.g., excellent) reliability due to sufficient curing during exposure or thermal curing and to prevent or reduce deterioration of transmittance due to non-reaction (e.g., residue) initiators, thereby preventing or reducing deterioration of optical characteristics of the quantum dots.

Polymerization Inhibitor

For stability and dispersion improvement of the quantum dots, the curable composition according to an embodiment may further include a polymerization inhibitor.

The polymerization inhibitor may include a hydroquinone-based compound, a catechol-based compound, or a combination thereof, but the present disclosure is not necessarily limited thereto. When the curable composition according to an embodiment further includes the hydroquinone-based compound, the catechol-based compound, or the combination thereof, room temperature cross-linking during exposure after coating the curable composition may be prevented or reduced.

For example, the hydroquinone-based compound, the catechol-based compound, or the combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O,O')aluminum, or a combination thereof, but the present disclosure is not necessarily limited thereto.

The hydroquinone-based compound, the catechol-based compound, or the combination thereof may be utilized in the form of a dispersion, and the polymerization inhibitor may be included in the dispersion in an amount of about 0.001 wt % to about 3 wt %, for example, about 0.1 wt % to about 2 wt %, based on the total amount of the curable composition. When the polymerization inhibitor is included within the above ranges, the problem of aging at room temperature may be solved, and at the same time, reduction of sensitivity and surface peeling may be prevented or reduced.

Binder Resin

The binder resin may include an acryl-based resin, a cardo-based resin, an epoxy resin, or a combination thereof.

The acryl-based resin may be a copolymer of a first ethylenic unsaturated monomer and a second ethylenic unsaturated monomer that is copolymerizable therewith, and may be a resin including at least one acryl-based repeating unit.

Non-limiting examples of the acryl-based binder resin may include (e.g., may be) polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer, and/or the like, and may be utilized alone or as a mixture of two or more.

A weight average molecular weight of the acryl-based binder resin may be about 5,000 g/mol to about 15,000 g/mol. When the acryl-based binder resin has a weight average molecular weight within this range, close-contacting (e.g., adhesion) properties to a substrate and physical and chemical properties are improved, and a viscosity thereof is appropriate.

The acryl-based resin may have an acid value of about 80 mg KOH/g to about 130 mg KOH/g. When the acryl-based resin has an acid value within this range, a pixel pattern may have suitable (e.g., excellent) resolution.

The cardo-based resin may be any suitable one utilized in a related art (e.g., conventional) curable resin (or photosensitive resin) composition, and may be, for example, the same as disclosed in Korean Patent Application Laid-Open No. 10-2018-0067243, the entire content of which is incorporated herein by reference, but the present disclosure is not limited thereto.

The cardo-based resin may be, for example, prepared by mixing at least two selected from a fluorene-containing compound such as 9,9-bis(4-oxiranylmethoxyphenyl)fluorene; an anhydride compound such as benzenetetracarboxylic acid dianhydride, naphthalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, and/or tetrahydrophthalic anhydride; a glycol compound such as ethylene glycol, propylene glycol, and/or polyethylene glycol; an alcohol compound such as methanol, ethanol, propanol, n-butanol, cyclohexanol, and/or benzylalcohol; a solvent-based compound such as propylene glycol methylethylacetate, and/or N-methylpyrrolidone; a phosphorus compound such as triphenylphosphine; and an amine or ammonium salt compound such as tetramethylammonium chloride, tetraethylammonium bromide, benzyldiethylamine, triethylamine, tributylamine, and/or benzyltriethylammonium chloride.

A weight average molecular weight of the cardo-based binder resin may be about 500 g/mol to about 50,000 g/mol, for example, about 1,000 g/mol to about 30,000 g/mol. When the weight average molecular weight of the cardo-based binder resin is within these ranges, a satisfactory pattern may be formed without a residue during a production of a cured layer and without losing a film thickness during development of the solvent type (e.g., solvent based) curable composition.

When the binder resin is a cardo-based resin, the developability of the curable composition, particularly the photosensitive resin composition, including the binder resin is improved, and the sensitivity during photocuring is good, so that the fine pattern formation property is improved.

The epoxy resin may be a monomer or oligomer that is capable of being polymerized by heat, and may include a compound having a carbon-carbon unsaturated bond and a carbon-carbon cyclic bond.

The epoxy resin may include, but is not limited to, a bisphenol A-type epoxy resin, a bisphenol F-type epoxy resin, a phenol novolac-type epoxy resin, a cyclic aliphatic epoxy resin, and/or an aliphatic polyglycidyl ether.

Currently available products thereof may include bisphenyl epoxy resins such as YX4000, YX4000H, YL6121H, YL6640, and/or YL6677 from Yuka Shell Epoxy Co., Ltd.; cresol novolac-type epoxy resins such as EOCN-102, EOCN-1035, EOCN-104S, EOCN-1020, EOCN-1025, and/or EOCN-1027 from Nippon Kayaku Co., Ltd. and/or EPIKOTE 180S75 from Yuka Shell Epoxy Co., Ltd.; bisphenol A epoxy resins such as EPIKOTE 1001, 1002, 1003, 1004, 1007, 1009, 1010, and/or 828 from Yuka Shell Epoxy Co., Ltd.; bisphenol F-type epoxy resins such as EPIKOTE 807 and/or 834 from Yuka Shell Epoxy Co., Ltd.; phenol novolac-type epoxy resins such as EPIKOTE 152, 154, and/or 157H65 from Yuka Shell Epoxy Co., Ltd. and/or EPPN 201, 202 from Nippon Kayaku Co., Ltd.; other cyclic aliphatic epoxy resins such as CY175, CY177 and/or CY179 from CIBA-GEIGY A.G, ERL-4234, ERL-4299, ERL-4221, and/or ERL-4206 from U.C.C, Shodyne 509 from Showa Denko K.K., ARALDITE CY-182, CY-192 and/or CY-184 from CIBA-GEIGY A.G, Epichron 200 and/or 400 from Dainippon Ink and Chemicals, Inc., EPIKOTE 871, 872 and/or EP1032H60 from Yuka Shell Epoxy Co., Ltd., and/or ED-5661 and/or ED-5662 from Celanese Coatings Co., Ltd.; aliphatic polyglycidylethers such as EPIKOTE 190P and/or 191P from Yuka Shell Epoxy Co., Ltd., Epolite 100MF from Kyoesha Yushi Co., Ltd., and/or Epiol TMP from Nippon Yushi Co., Ltd., and/or the like.

For example, when the curable composition according to an embodiment is a solvent-free curable composition, the binder resin may be included in an amount of about 0.5 wt % to about 10 wt %, for example, about 1 wt % to about 5 wt %, based on the total amount of the curable composition. In this case, heat resistance and chemical resistance of the solvent-free curable composition may be improved, and storage stability of the composition may also be improved.

For example, when the curable composition according to an embodiment is a curable composition including a solvent, the binder resin may be included in an amount of about 1 wt % to about 30 wt %, for example, about 3 wt % to about 20 wt %, based on the total amount of the curable composition. In this case, pattern characteristics, heat resistance and chemical resistance may be improved.

Other Additives

The curable composition according to an embodiment may further include malonic acid; 3-amino-1,2-propanediol; a silane-based coupling agent; a leveling agent; a fluorine-based surfactant; or a combination thereof in order to improve heat resistance and reliability.

For example, the curable composition according to an embodiment may further include a silane-based coupling agent having a reactive substituent such as a vinyl group, a carboxyl group, a methacryloxy group, an isocyanate group, an epoxy group, and/or the like in order to improve close-contacting (e.g., adhesion) properties with a substrate.

Examples of the silane-based coupling agent may include (e.g., may be) trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexyl)ethyltrimethoxysilane, and/or the like, and may be utilized alone or in a mixture of two or more.

The silane-based coupling agent may be included in an amount of about 0.01 parts by weight to about 10 parts by weight based on 100 parts by weight of the curable composition. When the silane-based coupling agent is included within the range, close-contacting (e.g., adhesion) properties, storage capability, and/or the like are improved.

In addition, the curable composition may further include a surfactant, for example, a fluorine-based surfactant, as needed in order to improve coating properties and inhibit generation of spots, that is, to improve leveling performance.

The fluorine-based surfactant may have a low weight average molecular weight of about 4,000 g/mol to about 10,000 g/mol, for example, about 6,000 g/mol to about 10,000 g/mol. In addition, the fluorine-based surfactant may have a surface tension of about 18 mN/m to about 23 mN/m (measured in a 0.1% polyethylene glycol monomethylether acetate (PGMEA) solution). When the fluorine-based surfactant has a weight average molecular weight and a surface tension within these respective ranges, leveling performance may be further improved, and suitable (e.g., excellent) characteristics may be provided when slit coating as high speed coating is applied because less film defects may be generated by preventing or reducing a spot generation during the high speed coating and suppressing a vapor generation. That is, when the fluorine-based surfactant has a weight average molecular weight and a surface tension within the respective ranges described above, leveling performance may be further improved, and when coated utilizing high speed slit coating, spot generation and vapor generation may be reduced or prevented, thereby reducing film defects.

Examples of the fluorine-based surfactant may include (e.g., may be), BM-1000®, and BM-1100® (BM Chemie Inc.); MEGAFACE F 142D®, F 172®, F 173®, and F 183® Dainippon Ink Kagaku Kogyo Co., Ltd.); FULORAD FC-135®, FULORAD FC-170C®, FULORAD FC-430®, and FULORAD FC-431e (Sumitomo 3M Co., Ltd.); SURFLON S-112®, SURFLON S-113®, SURFLON S-131®, SURFLON S-141®, and SURFLON S-145® (ASAHIGlass Co., Ltd.); and SH-28PA®, SH-190®, SH-193®, SZ-6032®, and SF-8428®, and/or the like (Toray Silicone Co., Ltd.); and F-482, F-484, F-478, F-554 and/or the like from DIC Co., Ltd.

In addition, the curable composition according to an embodiment may include a silicone-based surfactant in addition to the fluorine-based surfactant. Examples of the silicone-based surfactant may include (e.g., may be) TSF400, TSF401, TSF410, TSF4440, and/or the like of Toshiba Silicone Co., Ltd., but the present disclosure is not limited thereto.

The surfactant may be included in an amount of about 0.01 parts by weight to about 5 parts by weight, for example, about 0.1 parts by weight to about 2 parts by weight based on 100 parts by weight of the curable composition. When the surfactant is included within these ranges, less foreign materials are produced (or included) in a sprayed composition.

In addition, the curable composition according to an embodiment may further include other additives such as an antioxidant, a stabilizer, and/or the like in a set or predetermined amount, unless desired properties are deteriorated (when these additives are included).

Solvent

The curable composition according to an embodiment may be a solvent type (e.g., solvent based) curable composition that further includes a solvent.

The solvent may, for example, include one or more alcohols such as methanol, ethanol, and/or the like; one or more glycol ethers such as ethylene glycol methylether, ethylene glycol ethylether, propylene glycol methylether, and/or the like; one or more cellosolve acetates such as methyl cellosolve acetate, ethyl cellosolve acetate, diethyl cellosolve acetate, and/or the like; one or more carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and/or the like; one or more propylene glycol alkylether acetates such as propylene glycol monomethylether acetate, propylene glycol propylether acetate, and/or the like; one or more ketones such as methylethylketone, cyclohexanone, 4-hydroxy-4-methyl-2-pentanone, methyl-n-propylketone, methyl-n-butylketone, methyl-n-amylketone, 2-heptanone, and/or the like; one or more saturated aliphatic monocarboxylic acid alkyl esters such as ethyl acetate, n-butyl acetate, isobutyl acetate, and/or the like; one or more lactate esters such as methyl lactate, ethyl lactate, and/or the like; one or more hydroxy acetic acid alkyl esters such as methyl hydroxyacetate, ethyl hydroxyacetate, butyl hydroxyacetate, and/or the like; one or more acetic acid alkoxyalkyl esters such as methoxymethyl acetate, methoxyethyl acetate, methoxybutyl acetate, ethoxymethyl acetate, ethoxyethyl acetate, and/or the like; one or more 3-hydroxypropionic acid alkyl esters such as methyl 3-hydroxypropionate, ethyl 3-hydroxypropionate, and/or the like; one or more 3-alkoxypropionic acid alkyl esters such as methyl 3-methoxypropionate, ethyl 3-methoxypropionate, ethyl 3-ethoxypropionate, methyl 3-ethoxypropionate, and/or the like; one or more 2-hydroxypropionic acid alkyl ester such as methyl 2-hydroxypropionate, ethyl 2-hydroxypropionate, propyl 2-hydroxypropionate, and/or the like; one or more 2-alkoxypropionic acid alkyl esters such as methyl 2-methoxypropionate, ethyl 2-methoxypropionate, ethyl 2-ethoxypropionate, methyl 2-ethoxypropionate, and/or the like; one or more 2-hydroxy-2-methylpropionic acid alkyl esters such as methyl 2-hydroxy-2-methylpropionate, ethyl 2-hydroxy-2-methylpropionate, and/or the like; one or more 2-alkoxy-2-methylpropionic acid alkyl esters such as methyl 2-methoxy-2-methylpropionate, ethyl 2-ethoxy-2-methylpropionate, and/or the like; one or more esters such as 2-hydroxyethyl propionate, 2-hydroxy-2-methylethyl propionate, hydroxyethyl acetate, methyl 2-hydroxy-3-methylbutanoate, and/or the like; and/or one or more ketonate esters such as ethyl pyruvate, and/or the like, and in addition, may include (e.g., may be) N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and/or the like, but the present disclosure is not limited thereto.

For example, the solvent may be one or more desirably glycol ethers such as ethylene glycol monoethylether, ethylene diglycolmethylethylether, and/or the like; one or more ethylene glycol alkylether acetates such as ethyl cellosolve acetate, and/or the like; one or more esters such as 2-hydroxy ethyl propionate, and/or the like; one or more carbitols such as diethylene glycol monomethylether, and/or the like; one or more propylene glycol alkylether acetates such as propylene glycol monomethylether acetate, propylene glycol propylether acetate, and/or the like; one or more alcohols such as ethanol, and/or the like, or a combination thereof.

For example, the solvent may be a polar solvent including propylene glycol monomethylether acetate, dipropylene glycol methylether acetate, ethanol, ethylene glycoldimethylether, ethylenediglycolmethylethylether, diethylene glycoldimethylether, 2-butoxyethanol, N-methylpyrrolidine, N-ethylpyrrolidine, propylene carbonate, γ-butyrolactone, or a combination thereof.

The solvent may be included in a balance amount, for example, about 30 wt % to about 80 wt %, or about 35 wt % to about 70 wt % based on a total amount of the solvent type (e.g., solvent based) curable composition. When the solvent is within these ranges, the solvent type (e.g., solvent based) curable composition has appropriate viscosity and thus may have suitable (e.g., excellent) coating property when coated in a large area through spin-coating and/or slit-coating.

Another embodiment provides a cured layer manufactured utilizing the aforementioned curable composition and a display device including the cured layer.

One of the suitable methods of manufacturing the cured layer may include coating the aforementioned curable composition on a substrate utilizing an ink-jet coating (e.g., spraying) method to form a pattern (S1); and curing the coated pattern (S2).

(S1) Formation of Pattern

The curable composition may desirably be coated to be about 0.5 μm to about 20 μm in thickness on a substrate in an ink-jet spraying method. The ink-jet spraying method may form a pattern by spraying (or jetting) a single color per each nozzle and repeating the spraying as many times as the number of colors needed, but the pattern may be formed by concurrently or simultaneously spraying the number of colors needed through each ink-jet nozzle in order to reduce the number of processes. That is, the pattern may be formed by concurrently spraying the number of colors needed through a plurality of nozzles (e.g., each containing one of the colors).

(S2) Curing

The obtained pattern is cured to obtain a pixel. Herein, the curing method may be thermal curing and/or photocuring process. The thermal curing process may be performed at greater than or equal to about 100° C., desirably, in a range of about 100° C. to about 300° C., and more desirably, in a range of about 160° C. to about 250° C. The photocuring process may include irradiating an actinic ray such as a UV ray of about 190 nm to about 450 nm, for example, about 200 nm to about 500 nm. The irradiating is performed by utilizing a light source such as a mercury lamp with a low pressure, a high pressure, or an ultrahigh pressure, a metal halide lamp, an argon gas laser, and/or the like. An X ray, an electron beam, and/or the like may be also utilized as needed.

The other method of producing the cured layer may include manufacturing a cured layer utilizing the aforementioned curable composition by a lithographic method as follows.

(1) Coating and Film Formation

The aforementioned curable composition is coated to have a desired thickness, for example, a thickness ranging from about 2 μm to about 10 μm, on a substrate (which has undergone a set or predetermined pretreatment), utilizing a spin coating method, a slit coating method, a roll coating method, a screen-printing method, an applicator method, and/or the like. Then, the coated substrate is heated at a temperature of about 70° C. to about 90° C. for about 1 minute to about 10 minutes to remove a solvent and to form a film.

(2) Exposure

The resultant film is irradiated by an actinic ray such as a UV ray of about 190 nm to about 450 nm, for example, about 200 nm to about 500 nm, through a mask with a set or predetermined shape to form a desired pattern. The irradiating is performed by utilizing a light source such as a mercury lamp with a low pressure, a high pressure, or an ultrahigh pressure, a metal halide lamp, an argon gas laser, and/or the like. An X ray, an electron beam, and/or the like may also be utilized as needed.

Exposure process uses, for example, a light dose of 500 mJ/cm$^2$ or less (with a 365 nm sensor) when a high pressure mercury lamp is utilized. However, the light dose may vary depending on kinds of each component of the curable composition, their combination ratio, and/or a dry film thickness.

(3) Development

After the exposure process, an alkali aqueous solution is utilized to develop the exposed film by dissolving and removing an unnecessary part except the exposed part, thereby forming an image pattern. In other words, when the alkali developing solution is utilized for the development, a non-exposed region is dissolved, and an image color filter pattern is formed.

(4) Post-Treatment

The developed image pattern may be heated again or irradiated by an actinic ray and/or the like for curing, in order to accomplish suitable (e.g., excellent) quality in terms of heat resistance, light resistance, close-contacting (e.g., adhesion) properties, crack-resistance, chemical resistance, high strength, storage stability, and/or the like. Hereinafter, the subject matter of the present disclosure is illustrated in more detail with reference to examples. These examples, however, are not in any sense to be interpreted as limiting the scope of the present disclosure.

Preparation of Polymerizable Compound

Preparation Example 1

100 g of triethylene glycol and 14.4 g of acrylic acid were added to 500 mL of cyclohexane and then, stirred. 0.15 g of CuCl$_2$ and 15 g of p-toluene sulfonic acid were added thereto, and after fastening a dean-stark-condenser and increasing the temperature up to 100° C., the obtained mixture was stirred for 8 hours, thereby completing the reaction. Subsequently, 200 mL of ethyl acetate and a NaOH dilution were added thereto for extraction, and methylene chloride was added again thereto, followed sequentially by extraction, neutralization, and solvent removal. After redissolved in 100 mL of ethyl acetate, the solvent was removed therefrom, and the product was dried in a vacuum oven for 24 hours. Accordingly, a polymerizable compound represented by Chemical Formula E-1 was prepared.

Chemical Formula E-1

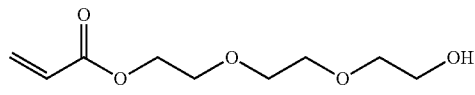

Comparative Preparation Example 1

100 g of 1,6-hexanediol and 20 g of acrylic acid were sufficiently stirred with 500 mL of cyclohexane. Subsequently, 0.14 g of CuCl$_2$ and 14 g of p-toluene sulfonic acid were added thereto, and after fastening a dean-stark-condenser and increasing the temperature up to 100° C., the obtained mixture was stirred for 8 hours, thereby completing the reaction. Thereafter, the same process conducted after the completion of the reaction as Preparation Example 1 was performed, thereby obtaining a polymerizable compound represented by Chemical Formula C-1.

Chemical Formula C-1

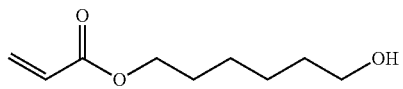

Comparative Preparation Example 2

100 g of 2-ethyl-2-(hydroxymethyl)-1,3-propanediol and 17.7 g of acrylic acid were sufficiently stirred with 500 mL of cyclohexane. Subsequently, 0.16 g of CuCl$_2$ and 12.8 g of p-toluene sulfonic acid were added thereto, and after fastening a dean-stark-condenser and increasing the temperature up to 100° C., the obtained mixture was stirred for 8 hours, completing the reaction. Thereafter, the same process conducted after the completion of the reaction as Preparation Example 1 was performed, thereby preparing a polymerizable compound represented by Chemical Formula C-2.

Chemical Formula C-2

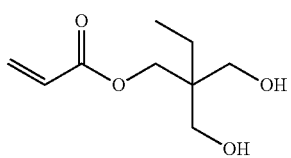

Preparation of Surface-Modified Quantum Dot Dispersion

Preparation Example 2

After putting a magnetic bar in a 3-necked round-bottomed flask, green quantum dot dispersion solution (InP/ZnSe/ZnS, Hansol Chemical) or a red quantum dot dispersion solution (InP/ZnSe/ZnS, Hansol Chemical) were respectively put therein. Subsequently, a compound represented by Chemical Formula Q (a ligand) was added thereto and then, stirred at 80° C. under a nitrogen atmosphere. When the reaction was completed, after decreasing the temperature down to room temperature (23° C.), the quantum dot reaction solution was added to cyclohexane, and the precipitates were collected. The precipitates were separated from the cyclohexane through centrifugation and then, sufficiently dried in a vacuum oven for 24 hours, thereby obtaining quantum dots as a surface-modified solid.

The surface-modified solid green quantum dots or red quantum dots were mixed at the same weight ratio with a compound represented by Chemical Formula 3-1 (triethylene glycol dimethacrylate, Miwon Commercial Co., Ltd) and then, stirred for 12 hours, thereby obtaining the surface-modified quantum dots dispersion.

Synthesis of Compound Represented by Chemical Formula Q 100 g of PH-4 (Hannong Chemical Inc.) was put in a 2 neck round-bottomed flask and then, sufficiently dissolved in 300 mL of THF. Subsequently, 15.4 g of NaOH and 100 mL of water were injected thereinto at 0° C. and then, sufficiently dissolved, until a clear solution was obtained.

Then, a solution obtained by dissolving 73 g of para-toluene sulfonic chloride in 100 mL of THF was slowly injected thereinto at 0° C. The injection proceeded for 1 hour, and the obtained mixture was stirred at room temperature for 12 hours. When the reaction was completed, an excessive amount of methylene chloride was added thereto and then, stirred, and a $NaHCO_3$ saturated solution was added thereto, which was followed by extraction, titration, and water removal. After removing the solvent, the residue was dried in a drying oven for 24 hours. 50 g of the dried product was put in a 2 necked round-bottomed flask and sufficiently mixed in 300 mL of ethanol. Subsequently, 27 g of thiourea was added thereto and dispersed therein and then, refluxed at 80° C. for 12 hours. Then, an aqueous solution prepared by dissolving 4.4 g of NaOH in 20 mL of water was injected thereinto, while further stirred for 5 hours, an excessive amount of methylene chloride was added thereto, and then, a hydrochloric acid aqueous solution was added thereto, which was followed sequentially by extraction, titration, water removal, and solvent removal. The obtained product was dried in a vacuum oven for 24 hours, thereby obtaining a compound represented by Chemical Formula Q.

Preparation of Curable Compositions

Examples 1 to 3 and Comparative Examples 1 to 4

Each curable composition according to Examples 1 to 3 and Comparative Examples 1 to 4 was prepared by utilizing the respective compositions shown in Table 1.

Specifically, the quantum dot dispersion was mixed and diluted by the polymerizable compound represented by Chemical Formula E-1 and the polymerizable compound represented by Chemical Formula 3-1, and a polymerization inhibitor was added thereto and then, stirred for 5 minutes. Subsequently, a photoinitiator (TPO-L, PolyNetron Co., Ltd.) was injected thereinto, and a light diffusing agent dispersion was added thereto. Then, the obtained crude solution was stirred for 1 hour, thereby preparing a curable composition. For example, a curable composition of Example 1 was prepared by mixing 40 g of a surface-modified green quantum dot solid with 40 g of the polymerizable compound represented by Chemical Formula 3-1 to prepare a quantum dot dispersion, adding 7 g of the polymerizable compound represented by Chemical Formula 3-1, 1 g of the polymerizable compound represented by Chemical Formula E-1, and 1 g of a polymerization inhibitor to the quantum dot dispersion and stirring them for 5 minutes, and subsequently, adding 3 g of a photoinitiator and 8 g of light diffusing agent dispersion thereto and stirring them.

(A) Quantum Dot (A-1) Surface-modified green quantum dot solid content prepared in Preparation Example 2

(A-2) Surface-modified red quantum dot solid content prepared in Preparation Example 2

(B) Polymerizable Compound (B-1) Polymerizable compound represented by Chemical Formula E-1

(B-2) Polymerizable compound represented by Chemical Formula C-1

(B-3) Polymerizable compound represented by Chemical Formula C-2

(B-4) Compound represented by Chemical Formula 3-1

(C) Photopolymerization Initiator

OXE01 (BASF)

(D) Light Diffusing Agent

Titanium dioxide dispersion (20 wt % of solid $TiO_2$, average particle diameter: 200 nm, Ditto Technology Co., Ltd.)

(E) Polymerization Inhibitor

Methylhydroquinone (5 wt % in a monomer represented by Chemical Formula 3-1, Tokyo Chemical Industry Co., Ltd.)

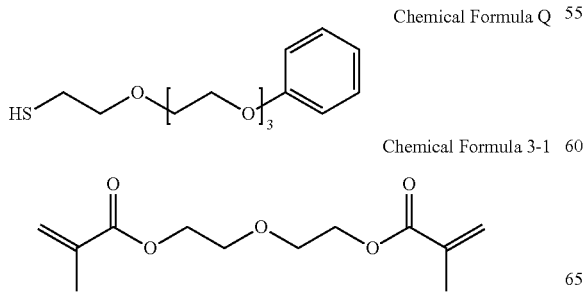

Chemical Formula Q

Chemical Formula 3-1

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| (A) quantum dot | A-1 | 40 | 40 | — | 40 | — | 40 | 40 |
|  | A-2 | — | — | 40 | — | 40 | — | — |
| (B) polymerizable compound | B-1 | 1 | 5 | 5 | — | — | — | — |
|  | B-2 | — | — | — | — | — | 5 | — |
|  | B-3 | — | — | — | — | — | — | 5 |
|  | B-4 | 47 | 43 | 43 | 48 | 48 | 43 | 43 |
| (C) photopolymerization initiator |  | 3 | 3 | 3 | 3 | 3 | 3 | 3 |
| (D) light diffusing agent |  | 8 | 8 | 8 | 8 | 8 | 8 | 8 |
| (E) polymerization inhibitor |  | 1 | 1 | 1 | 1 | 1 | 1 | 1 |
| Sum |  | 100 | 100 | 100 | 100 | 100 | 100 | 100 |

(unit: wt %)

Evaluation 1: Evaluation of Optical Properties

The curable compositions according to Examples 1 to 3 and Comparative Examples 1 to 4 were each respectively coated to be about 15 μm thick on a glass substrate or a yellow photoresist (YPR) substrate by utilizing a spin coater (800 rpm, 5 seconds, Opticoat MS-A150, Mikasa Co., Ltd.), exposed at 5000 mJ (83° C., 10 seconds) with a 395 nm UV exposer under a nitrogen atmosphere, and dried at 180° C. in a forced convection drying furnace for 30 minutes under the nitrogen atmosphere. Subsequently, each 2 cm×2 cm single film specimen was loaded in an integrating sphere equipment (QE-2100, Otsuka Electronics Co., Ltd.) and evaluated with respect to a photoefficiency retention rate, quantum efficiency, a maximum emission wavelength, and a full width at half maximum (FWHM), and the results are shown in Table 2.

Figure 2:
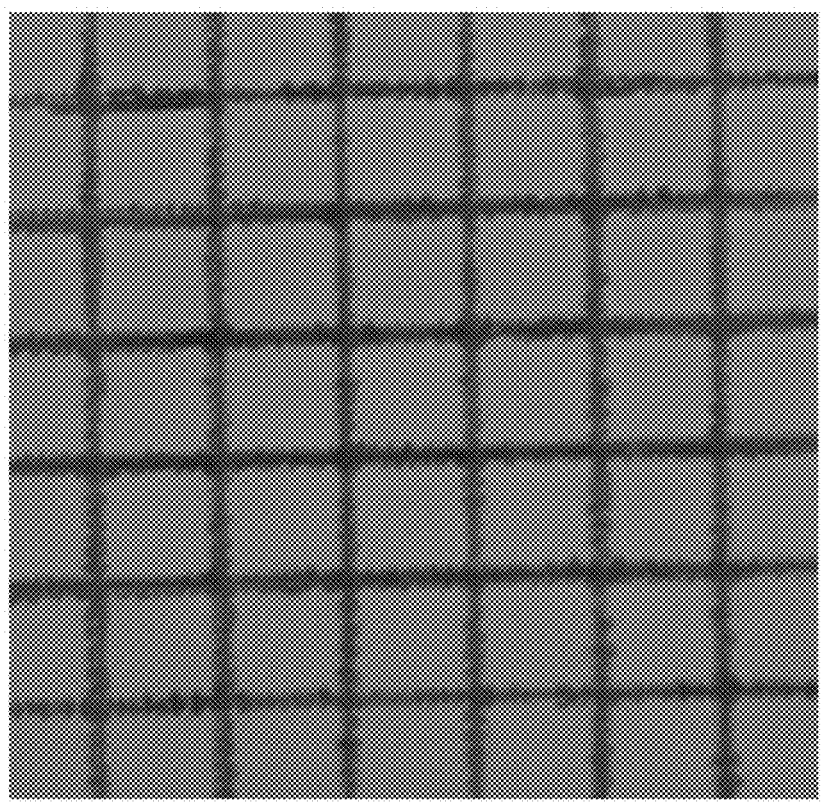
FIG. 2 is a photograph showing the cross-cut evaluation result of a pattern after applying the curable composition according to Example 2 on a substrate and developing the same.
Figure 3:
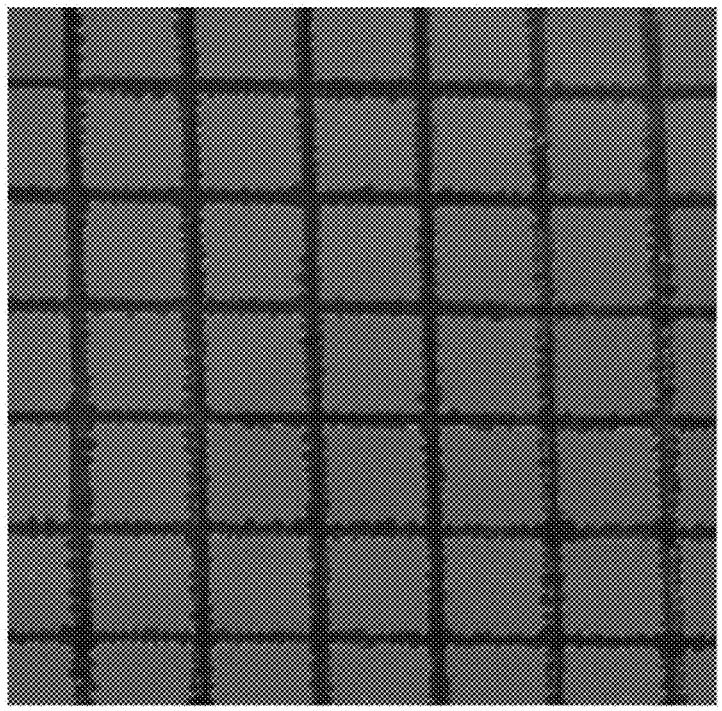
FIG. 3 is a photograph showing the cross-cut evaluation result of a pattern after applying the curable composition according to Example 3 on a substrate and developing the same.
Figure 4:
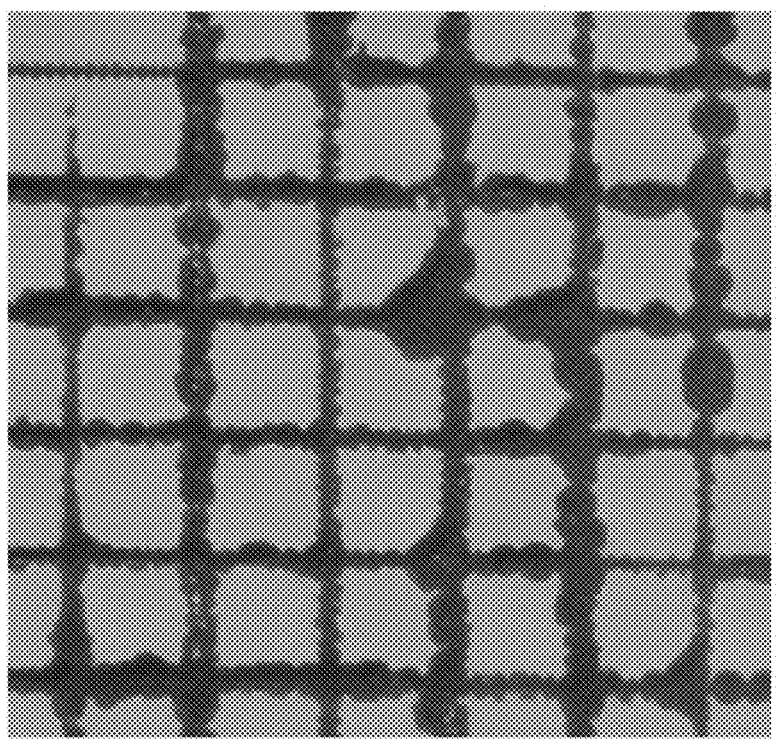
FIG. 4 is a photograph showing the cross-cut evaluation result of a pattern after applying the curable composition according to Comparative Example 1 on a substrate and developing the same.
Figure 5:
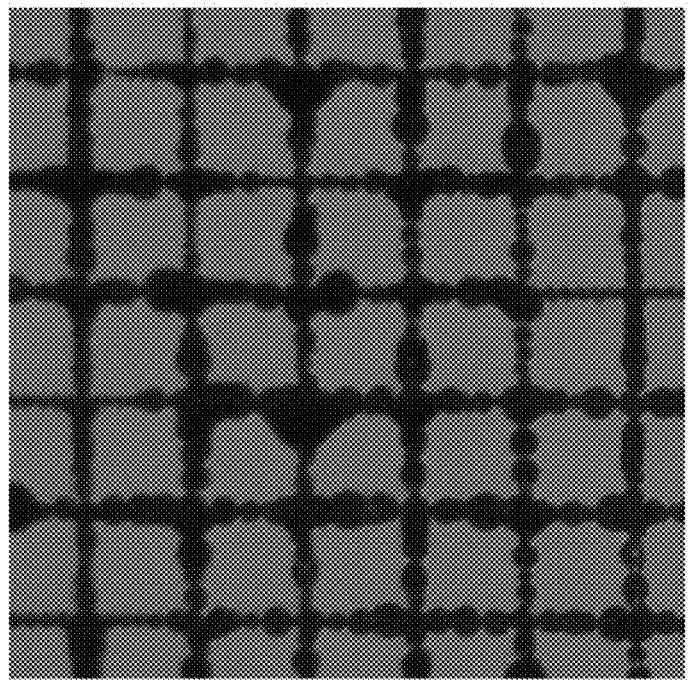
FIG. 5 is a photograph showing the cross-cut evaluation result of a pattern after applying the curable composition according to Comparative Example 2 on a substrate and developing the same.
Figure 6:
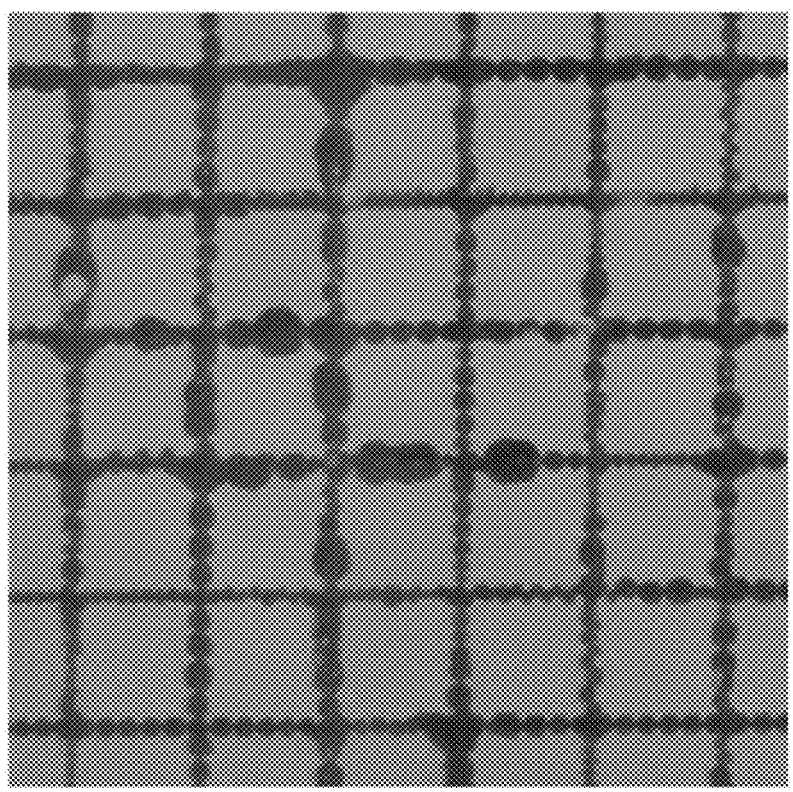
FIG. 6 is a photograph showing the cross-cut evaluation result of a pattern after applying the curable composition according to Comparative Example 3 on a substrate and developing the same.
Figure 7:
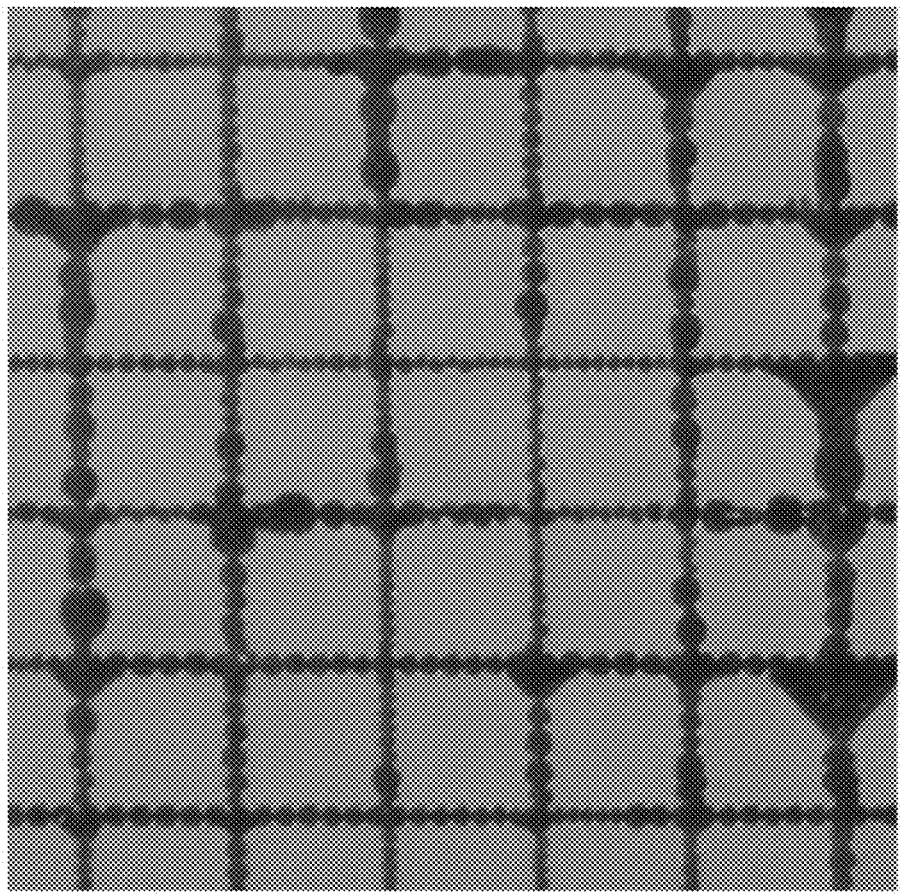
FIG. 7 is a photograph showing the cross-cut evaluation result of a pattern after applying the curable composition according to Comparative Example 4 on a substrate and developing the same.

Evaluation 2: Evaluation of Close-Contacting Force (e.g., Adhesion Force) of Pattern The curable compositions according to Examples 1 to 3 and Comparative Examples 1 to 4 were each respectively coated to be about 15 μm thick on a cleaned SiOx substrate with a spin coater (800 rpm, 5 seconds, Opticoat MS-A150, Mikasa Co., Ltd.), exposed at 5000 mJ (83° C., 10 seconds) with a 395 nm UV exposer under a nitrogen atmosphere, and dried at 180° C. in a forced convection drying furnace for 30 minutes under the nitrogen atmosphere. Subsequently, the single film specimens were respectively engraved into a 2 mm×2 mm lattice pattern by utilizing a cross hatch cutter, and a peeling state thereof after a peeling test utilizing an adhesive tape was evaluated with naked eyes and then, judged based on a cross-cut reference. In addition, a pattern close-contacting force (e.g., adhesion force) was evaluated by fixing a Stud pin to each 1 cm×1 cm single film specimen formed in the same method as above and utilizing an UTM Peel-off evaluation method (Inspekt 10-1, Hegewald & Peschke GmbH), and the results are shown in Table 2 and FIGS. 1 to 7.

TABLE 2

|  | Photoefficiency retention rate (%) | Quantum efficiency (EQE, %) | Maximum emission wavelength (nm) | Full width at half maximum (FWHM) (nm) | Close-contacting force (e.g., adhesion force) of pattern | |
|---|---|---|---|---|---|---|
|  |  |  |  |  | Cross-cut | Stud pin (F) |
| Example 1 | 95.1 | 31.7 | 641.2 | 37.2 | 4B-5B | 12500 |
| Example 2 | 95.2 | 31.8 | 641.4 | 37.3 | 5B | 13600 |
| Example 3 | 95.2 | 30.8 | 535.2 | 34.5 | 5B | 13600 |
| Comparative Example 1 | 95.0 | 31.2 | 641.4 | 37.3 | 2B | 10100 |
| Comparative Example 2 | 95.0 | 30.2 | 535.2 | 34.6 | 2B | 10050 |
| Comparative Example 3 | 95.1 | 31.5 | 641.3 | 37.2 | 3B | 10500 |
| Comparative Example 4 | 95.1 | 31.4 | 641.4 | 37.2 | 3B | 10650 |

Referring to Table 2 and FIGS. 1 to 7, the curable compositions according to an embodiment (e.g., each of Examples 1-3) maintained a high photoefficiency retention rate and quantum efficiency and currently or simultaneously, exhibited sufficient processability due to the increased close-contacting force (e.g., adhesion force) of patterns.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. As used herein, the term "substantially," "about," and similar terms are used as terms of approximation and not as terms of degree, and are intended to account for the inherent deviations in measured or calculated values that would be recognized by those of ordinary skill in the art. Moreover, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While this disclosure has been described in connection with what is presently considered to be practical example embodiments, it is to be understood that the subject matter of the present disclosure is not limited to the disclosed embodiments, but, on the contrary, is intended to cover various modifications and equivalent arrangements included within the spirit and scope of the appended claims. Therefore, the aforementioned embodiments should be understood to be examples but not limiting the subject matter of the present disclosure in any way.

What is claimed is:

1. A curable composition, comprising:
(A) a quantum dot; and
(B) a polymerizable compound,
wherein the polymerizable compound comprises a compound represented by Chemical Formula 1:

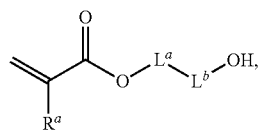

Chemical Formula 1 wherein, in Chemical Formula 1,
$R^a$ is a hydrogen atom or a substituted or unsubstituted C1 to C20 alkyl group, and
$L^a$ and $L^b$ are each independently a substituted or unsubstituted C1 to C20 oxyalkylene group or a substituted or unsubstituted C1 to C20 alkylene group, and $L^a$ and $L^b$ are different, and
wherein at least one of $L^a$ or $L^b$ is the substituted or unsubstituted C1 to C20 oxyalkylene group.

2. The curable composition of claim 1, wherein the substituted or unsubstituted C1 to C20 oxyalkylene group is represented by Chemical Formula 2:

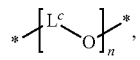

Chemical Formula 2 and
wherein, in Chemical Formula 2,
$L^c$ is a substituted or unsubstituted C1 to C20 alkylene group, and
n is an integer of 1 to 10.

3. The curable composition of claim 1, wherein the compound represented by Chemical Formula 1 is included at about 0.5 wt % to about 10 wt % in amount based on a total amount of the curable composition.

4. The curable composition of claim 1, wherein the polymerizable compound further comprises a polymerizable compound having a carbon-carbon double bond at each terminal end.

5. The curable composition of claim 4, wherein the polymerizable compound having the carbon-carbon double bond at each terminal end has a weight average molecular weight of about 200 g/mol to about 1,000 g/mol.

6. The curable composition of claim 4, wherein the polymerizable compound having the carbon-carbon double bond at each terminal end is represented by Chemical Formula 3:

Chemical Formula 3

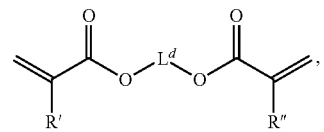

and
wherein, in Chemical Formula 3,
R' and R" are each independently a hydrogen atom or a substituted or unsubstituted C1 to C20 alkyl group, and
$L^d$ is a substituted or unsubstituted C5 to C20 alkylene group.

7. The curable composition of claim 4, wherein
the compound represented by Chemical Formula 1 is included at about 1.5 wt % to about 15 wt % in amount, and
the compound having the carbon-carbon double bond at each terminal end is included at about 85 wt % to about 98.5 wt % in amount,
each amount based on a total amount of the polymerizable compound.

8. A curable composition, comprising:
(A) a quantum dot; and
(B) a polymerizable compound,
wherein the polymerizable compound comprises a compound represented by Chemical Formula 1:

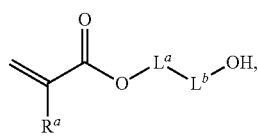

Chemical Formula 1 wherein, in Chemical Formula 1, $R^a$ is a hydrogen atom or a substituted or unsubstituted C1 to C20 alkyl group, and $L^a$ and $L^b$ are each independently a substituted or unsubstituted C1 to C20 oxyalkylene group or a substituted or unsubstituted C1 to C20 alkylene group, and $L^a$ and $L^b$ are different, wherein the quantum dot is surface-modified with a compound represented by one of Chemical Formulae 4 to 17 or a combination thereof:

Chemical Formula 4

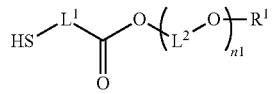

Chemical Formula 5

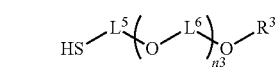

Chemical Formula 6

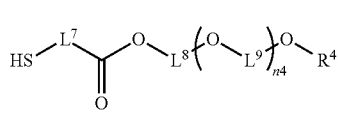

Chemical Formula 7

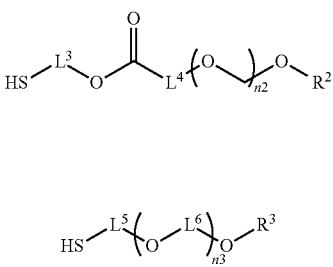

Chemical Formula 8

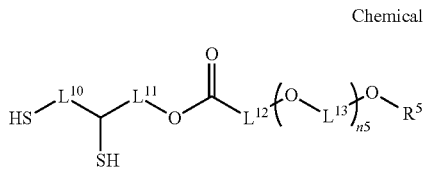

Chemical Formula 9

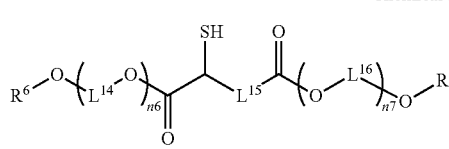

wherein, in Chemical Formula 4 to Chemical Formula 9, $R^1$ to $R^7$ are each independently a substituted or unsubstituted C1 to C10 alkyl group or a substituted or unsubstituted C6 to C20 aryl group, $L^1$ to $L^{16}$ are each independently a substituted or unsubstituted C1 to C10 alkylene group, and n1 to n7 are each independently an integer of 0 to 10, Chemical Formula 10

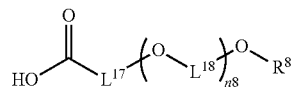

Chemical Formula 11

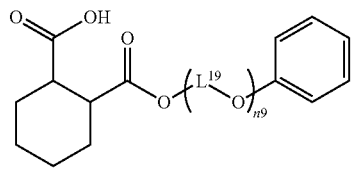

Chemical Formula 12

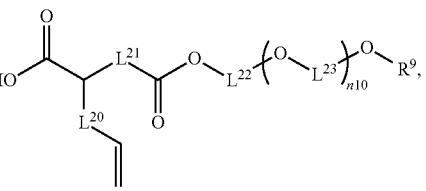

wherein, in Chemical Formula 10 to Chemical Formula 12, $R^8$ and $R^9$ are each independently a substituted or unsubstituted $C^1$ to $C^{10}$ alkyl group, $L^{17}$ to $L^{23}$ are each independently a substituted or unsubstituted C1 to C10 alkylene group, and n8 to n10 are each independently an integer of 0 to 10, Chemical Formula 13

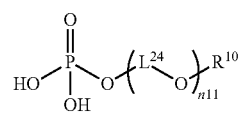

Chemical Formula 14

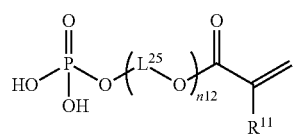

Chemical Formula 15

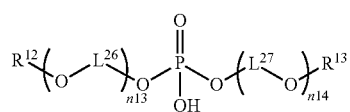

Chemical Formula 16

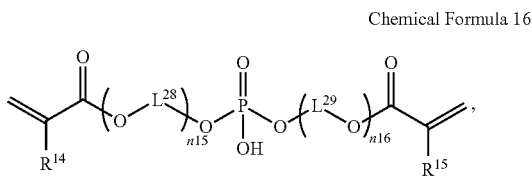

wherein, in Chemical Formula 13 to Chemical Formula 16,
$R^{10}$ to $R^{15}$ are each independently a hydrogen atom or a substituted or unsubstituted C1 to C10 alkyl group,
$L^{24}$ to $L^{29}$ are each independently a substituted or unsubstituted C1 to C10 alkylene group, and
n11 to n16 are each independently an integer of 0 to 10, Chemical Formula 17

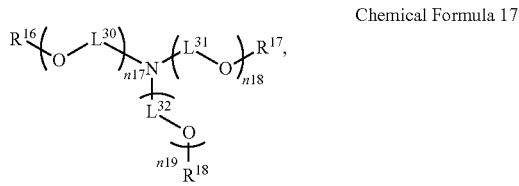

and
wherein, in Chemical Formula 17,
$R^{16}$ to $R^{18}$ are each independently a substituted or unsubstituted C1 to C10 alkyl group,
$L^{39}$ to $L^{32}$ are each independently a substituted or unsubstituted C1 to C10 alkylene group, and
n17 to n19 are each independently an integer of 0 to 10.

9. A curable composition, comprising:
(A) a quantum dot; and
(B) a polymerizable compound,
wherein the polymerizable compound comprises a compound represented by Chemical Formula 1:

Chemical Formula 1

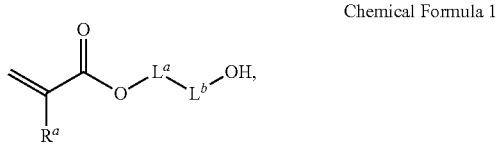

and
wherein, in Chemical Formula 1,
$R^a$ is a hydrogen atom or a substituted or unsubstituted C1 to C20 alkyl group, and
$L^a$ and $L^b$ are each independently a substituted or unsubstituted C1 to C20 oxyalkylene group or a substituted or unsubstituted C1 to C20 alkylene group, and $L^a$ and $L^b$ are different,
wherein the quantum dot has a maximum fluorescence emission wavelength in a range of about 500 nm to about 680 nm.

10. The curable composition of claim 1, wherein the curable composition further comprises a polymerization initiator, a light diffusing agent, a polymerization inhibitor, a binder resin, or a combination thereof.

11. The curable composition of claim 10, wherein the light diffusing agent comprises barium sulfate, calcium carbonate, titanium dioxide, zirconia, or a combination thereof.

12. The curable composition of claim 1, wherein the curable composition is a solvent-free curable composition.

13. The curable composition of claim 12, wherein
the solvent-free curable composition comprises
about 1 wt % to about 60 wt % of the (A) quantum dot in amount; and
about 40 wt % to about 99 wt % of the (B) polymerizable compound in amount,
each amount based on a total amount of the solvent-free curable composition.

14. The curable composition of claim 1, wherein the curable composition further comprises malonic acid; 3-amino-1,2-propanediol; a silane-based coupling agent; a leveling agent; a fluorine-based surfactant; or a combination thereof.

15. The curable composition of claim 1, wherein the curable composition further comprises a solvent.

16. The curable composition of claim 15, wherein
the curable composition comprises
about 1 wt % to about 40 wt % of the (A) quantum dot in amount;
about 1 wt % to about 20 wt % of the (B) polymerizable compound in amount; and
about 40 wt % to about 80 wt % of the solvent in amount,
each amount based on a total amount of the curable composition.

17. A cured layer manufactured utilizing the curable composition of claim 1.

18. A display device comprising the cured layer of claim 17.

* * * * *

UNITED STATES PATENT AND TRADEMARK OFFICE
CERTIFICATE OF CORRECTION

| | | |
|---|---|---|
| PATENT NO. | : 11,866,625 B2 | Page 1 of 1 |
| APPLICATION NO. | : 17/444812 | |
| DATED | : January 9, 2024 | |
| INVENTOR(S) | : Injae Lee et al. | |

It is certified that error appears in the above-identified patent and that said Letters Patent is hereby corrected as shown below:

In the Claims

In Column 31, Lines 53-58, in Claim 8, in Chemical Formula 9, delete " " and insert

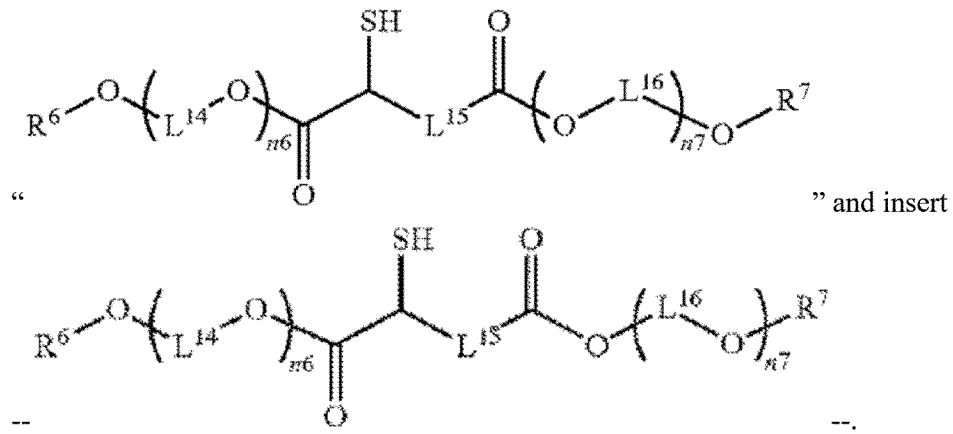

-- --.

In Column 32, Line 35, in Claim 8, delete "$C^1$ to $C^{10}$" and insert -- C1 to C10 --.

In Column 33, Line 31, in Claim 8, delete "$L^{39}$" and insert -- $L^{30}$ --.

Signed and Sealed this
Thirtieth Day of April, 2024

*Katherine Kelly Vidal*

Katherine Kelly Vidal
*Director of the United States Patent and Trademark Office*